United States Patent
Zedelmair et al.

(10) Patent No.: US 10,086,321 B2
(45) Date of Patent: Oct. 2, 2018

(54) SEPARATION DEVICE FOR LIQUIDS

(71) Applicant: REINZ-DICHTUNGS-GMBH, Neu-Ulm (DE)

(72) Inventors: Philipp Zedelmair, Ulm (DE); Christoph Erdmann, Ulm (DE); Francesco Zitarosa, Illertissen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 78 days.

(21) Appl. No.: 15/127,458

(22) PCT Filed: Mar. 27, 2015

(86) PCT No.: PCT/EP2015/056754
§ 371 (c)(1),
(2) Date: Sep. 20, 2016

(87) PCT Pub. No.: WO2015/150271
PCT Pub. Date: Oct. 8, 2015

(65) Prior Publication Data
US 2017/0136394 A1    May 18, 2017

(30) Foreign Application Priority Data

Mar. 31, 2014  (DE) .................... 20 2014 002 795 U

(51) Int. Cl.
*B01D 45/16*    (2006.01)
*F01M 13/04*    (2006.01)
(Continued)

(52) U.S. Cl.
CPC ............. *B01D 45/16* (2013.01); *B01D 45/04* (2013.01); *F01M 13/04* (2013.01);
(Continued)

(58) Field of Classification Search
CPC .... B01D 45/16; B01D 2279/60; F01M 13/04; F01M 13/0416; F01M 2013/0427; H01M 8/04164
See application file for complete search history.

(56) References Cited

U.S. PATENT DOCUMENTS 4,255,174 A * 3/1981 Simpson ................ B01D 45/16
                                                     55/306
4,477,271 A * 10/1984 Iwasyk .................. B01D 45/16
                                                     138/37
(Continued)

FOREIGN PATENT DOCUMENTS

CN         1925902 A       3/2007
DE    102004011177 A1     10/2005
(Continued)

OTHER PUBLICATIONS

European Patent Office, International Search Report with Written Opinion in PCT/EP2015/056754, dated Jun. 24, 2015, 10 pages, European Patent Office, Rijswijk, Netherlands.
(Continued)

*Primary Examiner* — Jason M Greene
(74) *Attorney, Agent, or Firm* — Marshall & Melhorn, LLC

(57) ABSTRACT

A liquid separation device for the separation of liquid or liquid mist from a gas, with at least one pair of basic carriers being a first and a second plate-shaped basic carrier, where in each of the first and the second basic carrier, at least two separator elements are formed. The separator elements each have a passage pipe with a gas inlet and a gas outlet, which are arranged at opposite sides of the respective plate-shaped basic carrier in such a way that the passage pipe extends through the respective plate-shaped basic carrier. The first and the second basic carrier being arranged one next to the other in flow direction of the gas. Each of the two separator (Continued)

elements in both basic carriers in which the separator elements are arranged adjacent to each other, with their passage pipes form continuous flow paths for the gas. At least in the transition area of a flow path from an upstream passage pipe to an adjacent downstream passage pipe, the inner diameter of the downstream passage pipe is larger than the inner diameter of the adjacent upstream passage pipe.

17 Claims, 7 Drawing Sheets

(51) Int. Cl.
*H01M 8/04119* (2016.01)
*B01D 45/04* (2006.01)

(52) U.S. Cl.
CPC .... *F01M 13/0416* (2013.01); *H01M 8/04164* (2013.01); *F01M 2013/0427* (2013.01); *F01M 2013/0461* (2013.01)

(56) References Cited

U.S. PATENT DOCUMENTS

| | | | | |
|---|---|---|---|---|
| 4,744,958 | A * | 5/1988 | Pircon | B01D 45/08 261/116 |
| 5,041,146 | A * | 8/1991 | Simmerlein-Erlbacher | B01D 45/10 55/444 |
| 5,355,719 | A * | 10/1994 | Kohsaka | B01D 45/16 210/248 |
| 7,852,143 | B2 | 12/2010 | Koifman et al. | |
| 2005/0247619 | A1* | 11/2005 | Berger | B01D 45/16 210/321.89 |
| 2007/0281205 | A1* | 12/2007 | Wagner | B01D 45/16 429/49 |
| 2010/0011961 | A1* | 1/2010 | Poorte | B01D 45/14 96/215 |
| 2016/0032798 | A1* | 2/2016 | Herman | F01M 13/04 95/268 |

FOREIGN PATENT DOCUMENTS

DE 102004037157 B4 7/2008
EP 0070707 A1 1/1983

OTHER PUBLICATIONS

German Patent Office, German Search Report of earliest claimed priority DE 20 2014 002 795.1, dated Jan. 9, 2015, 5 pages, German Patent Office, Munich, Germany.

CN Office Action of Application No. 2015-80028434.5 with English translation, dated Mar. 15, 2018.

Abstract of corresponding document No. CN1925902, obtained via Espacenet Patent Search (URL: http://wordwide.espacenet.com/?locale=en_EP).

* cited by examiner

SEPARATION DEVICE FOR LIQUIDS

BACKGROUND OF THE INVENTION

The present invention relates to a liquid separation device for the separation of liquids or liquid mist from a gas. It relates in particular to an oil or oil mist separator for the separation of oil and/or oil mist from blow-by gases of an internal combustion engine and to a water separator for the separation of water from the exhaust gases of a fuel cell stack. The present invention further relates to a valve cover for an internal combustion engine and an internal combustion engine provided with such a valve cover.

Liquid-gas separation devices as in the present invention are used for the separation of liquid or liquid mist from a gas. Such separators are for instance used for the separation of oil or oil mist from blow-by gases, which are also referred to as crankcase gases of internal combustion engines. A further possible area of use for liquid-gas-separators consists in the area of fuel cells, in particular such fuel cells, which operate with $H_2O$-humidification and/or in which $H_2O$ is produced as a reaction product, meaning in particular PEM or alkali fuel cells. In such fuel cells, the supplied reaction gases are usually humidified prior to their inlet. On the other hand, pure water is produced on the cathode side of the fuel cell as a reaction product, so that here a considerable excess of water is given on the exhaust side in the exhausted gases. This water excess condenses immediately after having left the fuel cell. In order to separate this water from the exhaust gases, liquid separators are used, too.

A starting point for the present invention are liquid separators as they are for instance described in DE 10 2004 037 157 A1. These liquid separators belong to the class of tube separators, as they comprise a passage tube with an inlet and an outlet for the gas to be purified. It is in general possible that it comprises a separate outlet for the separated liquid, but such an outlet is not mandatory.

The liquid separators described in DE 10 2004 037 157 A1 may comprise two basic carriers. Each of these basic carriers comprises passage tubes, in which helical segments are arranged as additional liquid separator elements. The passage tubes of each basic carrier in the flow direction of the gas are arranged one behind the other. The helical elements in the basic carriers may be arranged with identical sense of rotation or with opposite sense of rotation in subsequent passage pipes in subsequent basic carriers.

Such liquid separators as illustrated in DE 10 2004 037 157 A1 already show a good liquid separation function.

SUMMARY OF THE INVENTION

Here, it is the object of the present invention starting from such liquid separators in the state of the art, to provide for liquid separators, which show an improved separation function for liquids and/or liquid mist from a gas. It is further an object of the present invention to provide for a corresponding water separator, a corresponding air-oil separator, a valve cover for an internal combustion engine and a corresponding internal combustion engine. This object is solved by the liquid separation device according to claim 1, the water separator according to claim 15, the air-oil separator according to claim 16, the valve cover according to claim 17 and the internal combustion engine according to claim 19. Advantageous embodiments of the liquid separator according to the invention are given in the dependent claims 2 to 14, an advantageous embodiment of the valve cover according to the invention in claim 18.

Similar to the liquid separators described in DE 10 2004 037 157 A1, the liquid separators according to the invention comprise at least one pair of basic carriers. In the first and the second basic carrier of the pair of basic carriers, separation elements for the separation of liquid or liquid mist from a gas are arranged. Each of the two first and second basic carriers here comprises at least two separation elements, respectively. Each of the separation elements comprises a passage tube with a gas inlet and a gas outlet. At least two of the separator elements situated in different basic carriers are arranged in such a way that their gas passage ways join each other and this way form a joint flow path of the gas through the pair of basic carriers. The passage tubes may show a round cross section, e.g. a circular cross section or an angular cross section, e.g. a square cross section. Other arbitrary cross sections are however possible, too.

Surprisingly, it has been found that this kind of liquid separation devices can be further improved with respect to their separation performance, if along the flow path, at least in the area of the transition from one basic carrier to the next one, meaning from one separator element to the next separator element, the inner diameter of the separator elements increases. The increase of the inner diameter of the flow path may be continuous or stepwise. It is for instance possible that the separator element in the first basic carrier situated upward in the flow direction has a smaller inner diameter than the separator element in the second basic carrier situated downward in the flow direction, starting at its gas inlet. This then results in an abrupt or stepwise change of the diameter of the flow path in the area of the transition from the first basic carrier to the second basic carrier.

It is particularly advantageous if the inner diameter in the area of this transition or immediately at this transition increases by ≥10%, preferably by ≥20%, preferably by ≥40%.

It is essential for the present invention that a uniform flow path through one separator element in the first basic carrier and one separator element in the second basic carrier, respectively, results. This is for instance achieved in that one passage tube relating to a separator element arranged upstream and one passage tube relating to a separator element arranged downstream, respectively, immediately proceed one into the other and two such respective separator elements are uniquely related to each other. This means that none of the passage tubes of a separator element in the first basic carrier transits into two passage tubes corresponding to two different separator elements in the second basic carrier. In a corresponding way, more than two basic carriers may be provided in the liquid separation device, where in each of the basic carriers, a flow path through the liquid separation device results from a separation element and the corresponding passage tube.

According to the invention, it is of course possible that more than two separator elements are provided in each of the basic carriers, so that several possible flow paths through the liquid separation device result for the gas to be purified from liquid or liquid mist. In general, between two and 80 separator elements are arranged one next to the other in the plane of the basic carrier. It is particularly advantageous if in both basic carriers of the pair of basic carriers or in several of the basic carriers or in all basic carriers, the same number of separator elements is given, respectively. Basically, only two or several basic carriers each with two separator elements are required.

Different plate-shaped basic carriers can be arranged one behind the other in a modular manner. It is also possible to arrange them in a manner offset relative to each other or rotated relative to each other. The individual basic carriers are preferably not one-piece with each other. Rather, they are only connected to each other by positive fit and/or adhesive connection, e.g. using welding or gluing.

It is also possible to arrange the basic carriers in such a way that the areas distant to the actual passage tubes are not in immediate contact with each other, but show a small distance to each other. Nevertheless, for each of the passage tubes, at the transition a wall delimiting the respective flow path in one of the basic carriers is in contact with a wall delimiting the respective flow path in the other one of the basic carriers and this way, they also delimit the flow path at the transition between the two basic carriers. The flow passage tubes may show different geometries of the pipe, they may for instance be designed cylinder-shaped or conically, respectively, along their flow passage direction. As already described beforehand, it is essential for the invention that the diameter of the flow path increases in the area of the transition from one basic carrier to another basic carrier, with an abrupt increase being advantageous.

It has further turned out advantageous for the separation rate of the liquid separation device according to the invention if the length of the passage pipes of the separator elements in the downstream basic carrier is not considerably different from the length of the corresponding passage pipes of the separator elements in the upstream basic carrier. It is preferred if the length of the passage tube relating to the separator elements of an downstream basic carrier corresponds to at least half the length and to at most double the length of the passage tubes relating to the separator elements in the basic carrier arranged immediately ahead; the passage tubes here form joint gas passage paths. This is in particular true for a first basic carrier and a second basic carrier in one pair of basic carriers according to the invention.

As results from what is described above, adjacent basic carriers may have identical shape and/or design. It is in particular possible that they are entirely identically designed. It is however also possible to use differently designed basic carriers one behind the other. In the first mentioned case, an advantageous modular construction of the fluid separation device results. With both variants of liquid separation devices described ahead, it is particularly simple to adapt them for different requirements, e.g. for different internal combustion engines, by using a different number of basic carriers and/or an adaptation of the number of passage pipes in the basic carrier.

According to the invention, the separator elements may show particularly high rates of separation, if in the passage tubes of at least one, several or all liquid separation devices, a gas guiding element with guiding surfaces is arranged between the gas inlet and the gas outlet. The guiding surfaces of the separator elements then together with the inner wall of the passage pipe form the flow path in the passage pipe. They may in particular divide the flow path into two, three or more partial flow paths for the gas. The guiding surfaces in this respect do not extend orthogonal to the interface between the first and second basic carrier, but are bent. The flow paths separated from each other by guiding elements are not considered as different passage pipes in the context of this invention.

Such gas guiding elements are also disclosed in DE 10 2004 037 157 A1 as helical segments. The disclosure of DE 10 2004 037 157 A1 with respect to the design of the gas guiding elements as helical segments in its entirety is taken up in the present invention.

It is preferred if the gas guiding elements are formed as one-piece with the respective basic carrier and the respective separation element, e.g. by molding. Given the design of the liquid separation device with more than one piece, namely from more than one basic carrier to be mounted one after each other, the liquid separation device can exclusively be built up from basic carriers comprising no undercut. Therefore, these basic carriers are particularly suited for being produced by molding.

It is preferred if the gas guiding elements of two sequential passage pipes immediately adjoin to each other. Doing so, they may be arranged in such a way that in the area of transition from one basic carrier to the other basic carrier they are offset relative to the flow direction of the passage pipes. In particular, the terminal edge of the helical segment may be rotated, preferably by 45°, preferably by 90° relative to the entrance edge of an adjacent helical segment. If the shape of the basic carrier with the gas guiding elements arranged inside of it and one-piece with it, especially of helical segments, is chosen in a suited manner, then with an arrangement of several identical basic carriers one behind the other, the offset or rotation of the helical elements or gas guiding elements immediately results.

As an alternative, it is of course possible to choose different geometries for the gas guiding elements in adjacent basic carriers, in particular to choose different geometries in a first and in a second basic carrier of a pair of basic carriers. For example, it is possible to design the wall thickness of the helical segments differently, e.g. in that the wall thickness is reduced in flow direction.

The gas guiding elements, in particular helical segments, may be designed in such a way that they comprise a twister-shaped rotated wall and this way split the flow path through the passage pipe of a separator element e.g. into two partial flow paths. They may also be designed in such a way that they split the flow path through the passage pipe into three, four or more partial flow paths, which each extend one next to the other from the inlet of the passage pipe to the outlet of the passage pipe. Such a split can also be realized only partially in particular sections between the inlet and the outlet of the respective passage pipe.

The purified gas and the liquid separated from the gas by the liquid separator element preferably leave the liquid separator though a common outlet opening. It is however also possible to provide separate openings.

Typical wall thicknesses of the actual helical structure, thus of the gas guiding elements range between 0.1 and 1.0 mm, preferably between 0.13 and 0.9 mm. Typical wall thicknesses between the passage pipes range between 0.8 and 2.5 mm, preferably between 1.0 and 2.5 mm.

The water separator according to the invention serves for the separation of water from the exhaust gases of a fuel cell stack. It comprises at least one liquid separation device as described beforehand.

The oil separator according to the invention, sometimes also referred to as air-oil separator, serves for the separation of oil and/or oil mist from blow-by gases of an internal combustion engine. It comprises a liquid separation device as described beforehand. Such an oil separator may be arranged in a valve cover according to the invention for an internal combustion engine and thus also in an internal combustion engine according to the invention with such a valve cover. It is preferred that the oil separator according to the invention is arranged in such a way in the valve cover that the inner space of the valve cover is separated into two partial spaces, with a communication between both partial spaces being only possible through the passage pipes.

It is preferred if the basic carriers, optionally together with integral helicoids are produced from polyphenylene sulfide (PPS), liquid-crystal polymers (LCPs) or polyamide (PA) with or without fiber reinforcement. Among the PA materials, PA 6.6, PA 6, polyphthalamide (PPA) and PA 4.6 as well as blends of them, are preferred, again with or without fiber reinforcement. If the liquid separator is integrated into a valve cover, it is further preferred if the valve cover or at least part of it, is produced from the same polymeric material as the basic carriers. The same is true if the liquid separator is arranged in a separate housing. Here, it is also preferred if the housing and the basic carriers are produced essentially from the same polymeric materials.

In the following, some examples of liquid separation devices, oil separators and valve covers according to the invention are given. Identical or similar reference numbers refer to identical or similar elements, so that their description is not repeated in each case. The examples for liquid separation devices are valid both for the application in oil separators and in water separators, respectively. The statements given for oil separators are also valid for water separators, even though no distinct example is given for this.

In the following examples, embodiments of the present invention are shown, which in addition to the essential characteristics laid down in the independent claims also comprise optional and/or advantageous characteristics in different combinations. Each individual one of these optional and/or advantageous embodiments can enhance the invention laid down in the independent claims without the need to be combined with one, several or all another optional and/or advantageous enhancements illustrated simultaneously.

BRIEF DESCRIPTION OF THE DRAWINGS

It is shown in

DETAILED DESCRIPTION OF THE INVENTION

Figure 1:
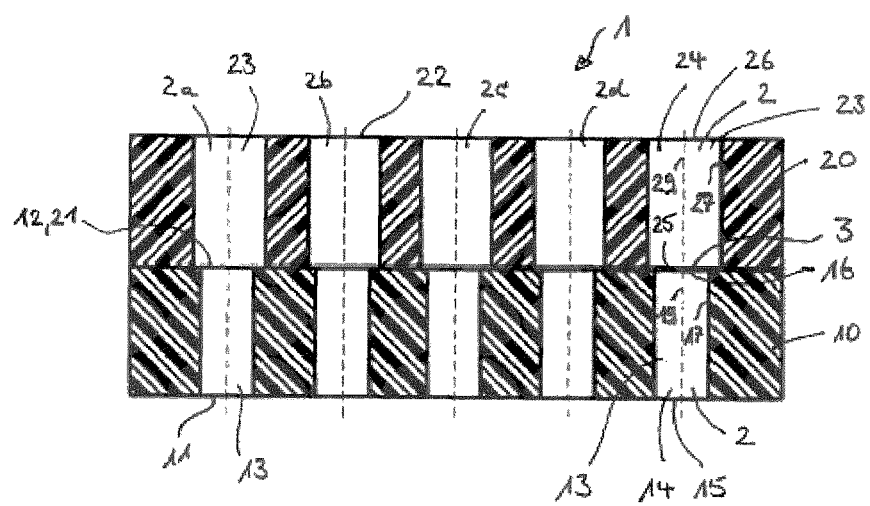
FIG. 1: A liquid separation device according to a first embodiment of the invention.

FIG. 1 shows a liquid separation device 1 according to the present invention. The liquid separation device 1 comprises two basic carriers 10, 20, which in a transition area 3 are arranged with positive fit. Each of these basic carriers 10, 20 comprises separator elements 13 or 23, respectively. In FIG. 1, only few of the separator elements are referred to with a reference number in order not to impact the clarity of the illustration.

In the first basic carrier 10, a total number of five separator elements 13 are arranged, only the outermost two of them are referred to with a reference number. Each of these separator elements 13 comprises a passage pipe 14 with a gas inlet 15 and a gas outlet 16. The passage pipe 14 is designed cylindrical with a central axis 10 and an inner wall 17. In FIG. 1, the fluid passage direction of the basic carriers 10 and 20 is indicated with an arrow 6. Accordingly, the gas passes the separator elements 13 from a first side 11 of the first basic carrier 10 to a second side 12 of the first basic carrier 10.

The second basic carrier 20 is constructed similarly, with the difference that the five separator elements here are referred to with reference number 23. The separator elements 23 again comprise a gas inlet 25 and a gas outlet 26 with the gas passing from a first side 21 to a second side 22 of the second basic carrier 20. The separator elements 2, 2a-2d are cylindrical with a central axis 29 and an inner wall 27, too.

The two basic carriers 10 and 20 are arranged one behind the other, so that the gas first passes the basic carrier 10 and then the basic carrier 20 along flow paths 2, 2a-d, with the liquid or liquid mist comprised in these gases to be separated during the passage. Both the purified gas and the separated liquid leave the separator element 13 at the gas outlet 26. In the embodiment in FIG. 1, the inner diameter of the separator elements 23 in the second basic carrier 20 is larger than the inner diameter of the separator elements 13 in the first basic carrier 10. At the transition between the first basic carrier 10 and the second basic carrier 20, the diameter of the flow paths 2, 2a-2d thus changes abruptly. Surprisingly, it has been found that this considerably improves the separation efficiency of the liquid separation device 1.

Figure 2:
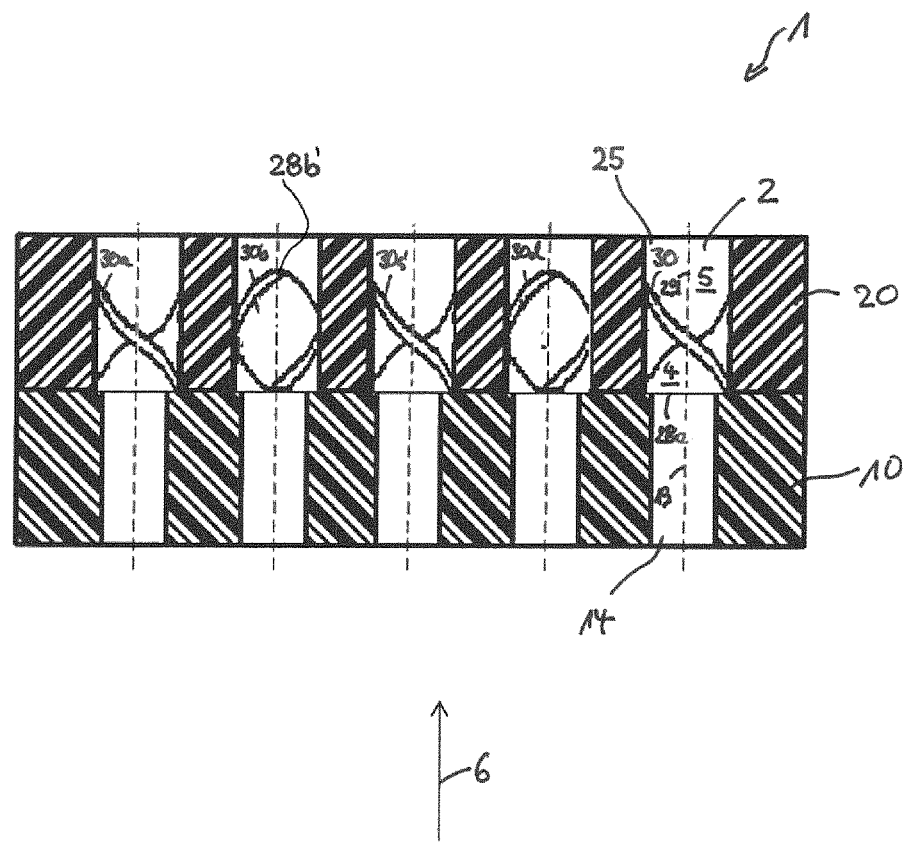
FIG. 2: A liquid separation device according to a second embodiment of the invention.

FIG. 2 shows a further liquid separator element according to the present invention. This liquid separator element 1 is designed as the one in FIG. 1. In addition, helical elements 30, 30a-30d are arranged in the passage pipes 25. They comprise a wall extending in a helical manner around the passage axis 29 and this way divide the flow path 2 for the gas inside of the second basic carrier 20 into two partial flow paths 4, 5. These helical elements are designed identical or similar to the ones shown in DE 10 2004 037 157 A1.

The helical segments advantageously comprise helicoids, the length of which is ≤ half the pitch of the helical segment. The helical segments, which are referred to with reference numbers 30, 30a to 30d, comprise an inlet-sided edge 28a and an outlet-sided edge 28b. Instead of the outlet-sided edge 28b, an outlet-sided edge 28b' is shown in a different passage pipe; the edge 28b in the passage pipe shown in the extreme right area would extend in the same plane as does the edge 28b' shown. With the arrangement of these helical elements 30, 30a-30d, the separation performance of the liquid separation device 1 is further improved.

Figure 3:
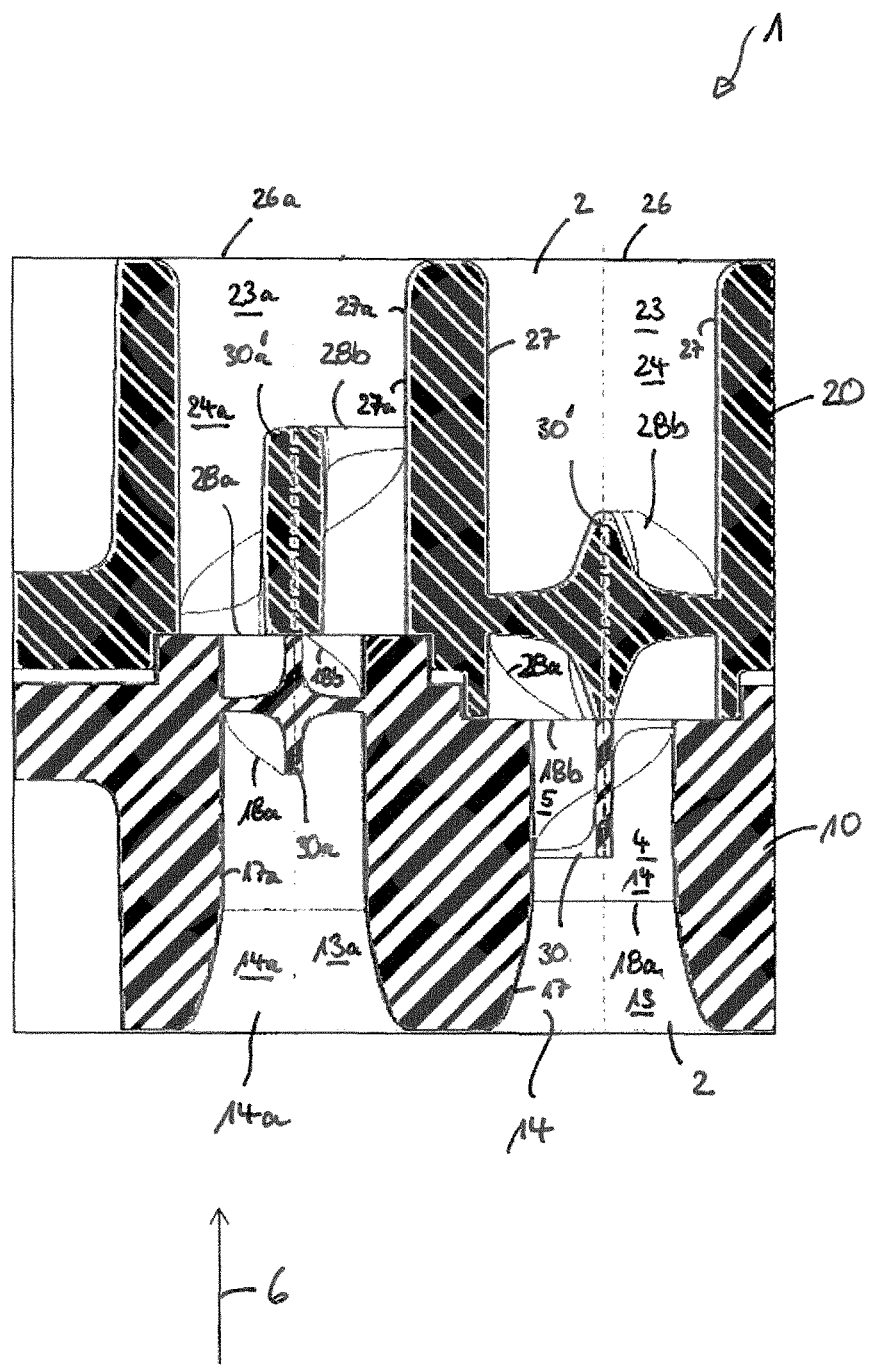
FIG. 3: A liquid separation device according to a third embodiment of the invention.

FIG. 3 shows a further liquid separation device 1 according to the invention with a pair of basic carriers with a first basic carrier 10 and a second basic carrier 20.

In general, this liquid separation device is designed similar to the one in FIG. 2. However, in addition to the separator elements 13, 13a, additional helical segments 30, 30a are arranged as gas guiding elements. These are realized similar to the gas guiding elements in the separator elements 23, 23a of the second basic carrier 20, which are now referred to as 30', 30a'. The thickness of the wall of the guiding geometries of the gas guiding elements 30, 30a is however smaller than the thickness of the wall of the gas guiding elements 30', 30'a.

Further, the separator elements 13, 13a now are not designed cylindrical but they have an inner wall 17, 17a that conically converges in the flow direction 6. In contrast, the separator elements 23, 23a in the second basic carrier 20 still have an essentially cylindrical passage pipe 24, 24a.

At the transition between the first basic carrier 10 and the second basic carrier 20, again an abrupt increase of the inner diameter of the flow path 2 takes places, as in this area the inner diameter of the passage pipes 24, 24a is larger than the inner diameter of the passage pipes 14, 14a.

In the area of this transition, the interfaces between the basic carriers 10 and 20 are realized with steps, so that the two basic carriers 10, 20 can be arranged with positive fit one on the other. The connection can further be secured by gluing of both basic carriers or inserting both basic carriers in their connected state jointly into a carrier seat.

Further, the outlet 26, 26a of the passage pipes 24, 24a is slightly widened.

Figure 4:
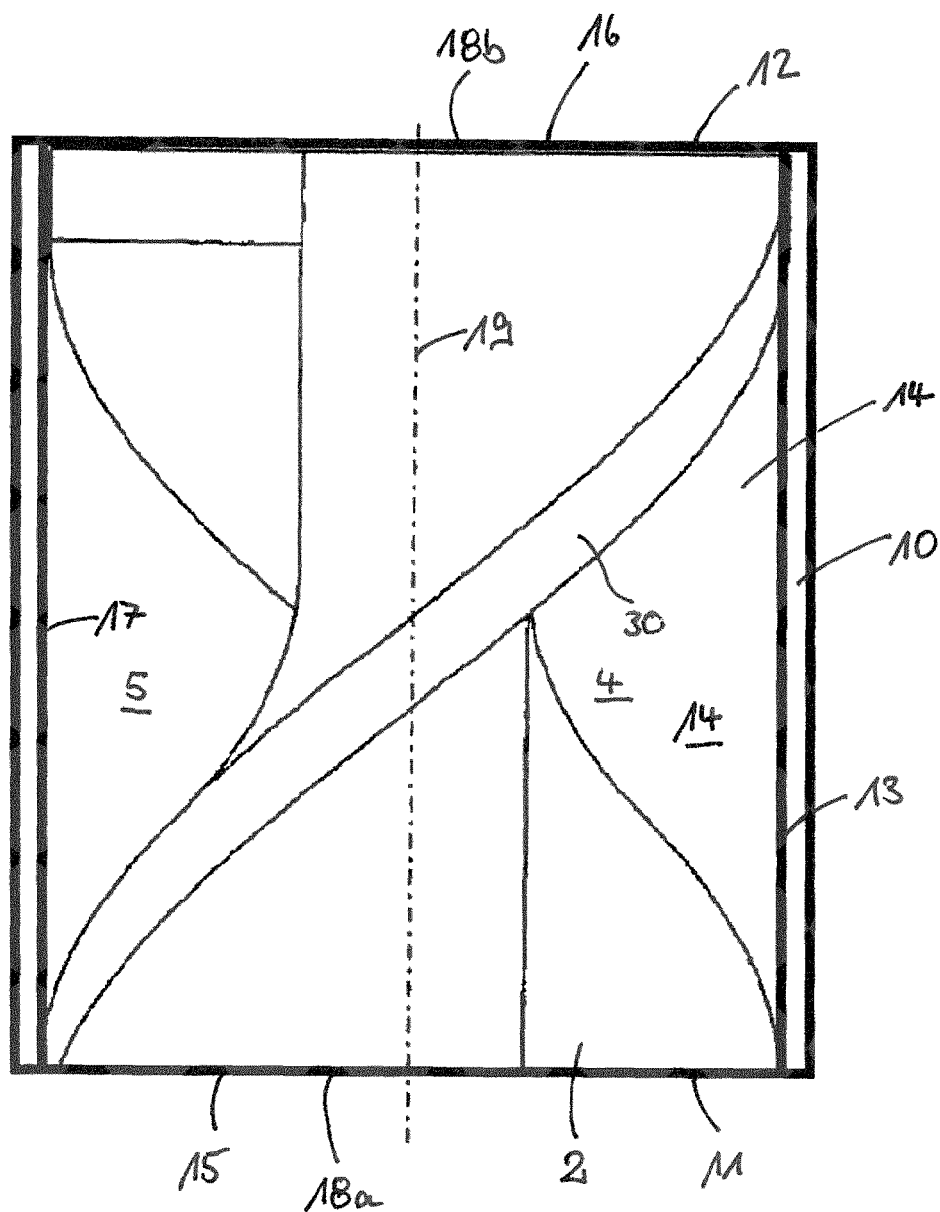
FIG. 4: A separator element of a liquid separation device as it is for instance shown in FIG. 2.

FIG. 4 shows a separator element 13 in a basic carrier 10 in detail. This separator element 13 comprises a passage pipe 14 with cylindrical shape. The passage pipe 14 comprises a gas inlet 15 and a gas outlet 16 and a cylindrical inner wall 17. In the passage pipe 14, a helical element 30 is arranged which with its wall divides the flow path 2 into two partial flow paths 4 and 5. These partial flow paths 4 and 5 in flow direction extend one next to the other along the central axis 19 and rotate helically around the central axis 19. The helical element 30 comprises an inlet-sided edge 18a and an outlet-sided edge 18b.

Figure 5:
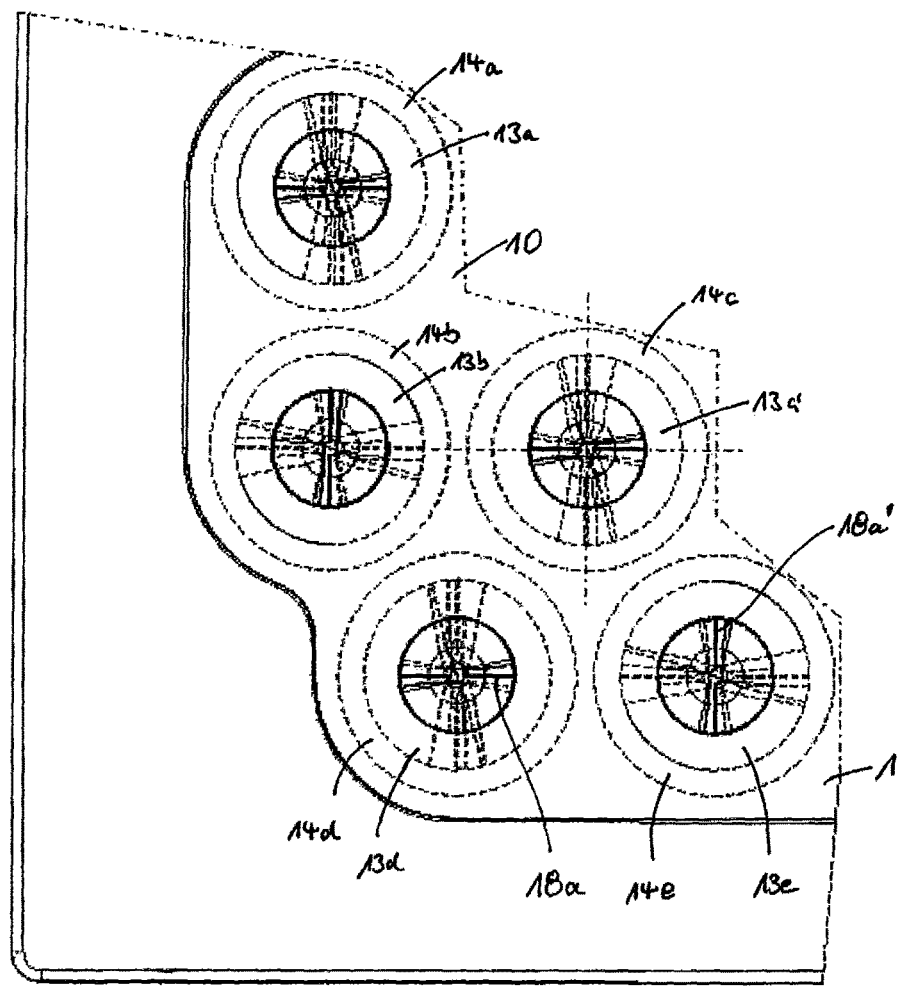
FIG. 5: A section of a liquid separation device according to a further example.

FIG. 5 now shows a top view to a liquid separation device 1 according to the present invention. In this liquid separation device 1, five separator elements 13a-13e can be identified, which each comprise a passage pipe 14a-14e. In the passage pipes 14a-14e, helical elements are indicated. The top view illustrates that the inlet edges 18a are rotated by 90° relative to the outlet edges 18a'. This allows for an offset of the helicoids of two subsequent basic carriers by e.g. 90°, even when two identical basic carriers of this kind are installed one immediately behind the other.

This way, the liquid separation devices according to the invention can comprise a large number of separator elements 13a ... arranged one next to the other in the plane of the basic carrier. Liquid separation devices 1 comprising up to 80 or even more separator elements 13a are possible. The number of liquid separator elements used depends on the respective aim of use and the conditions of use of the liquid separation device 1.

Figure 6:
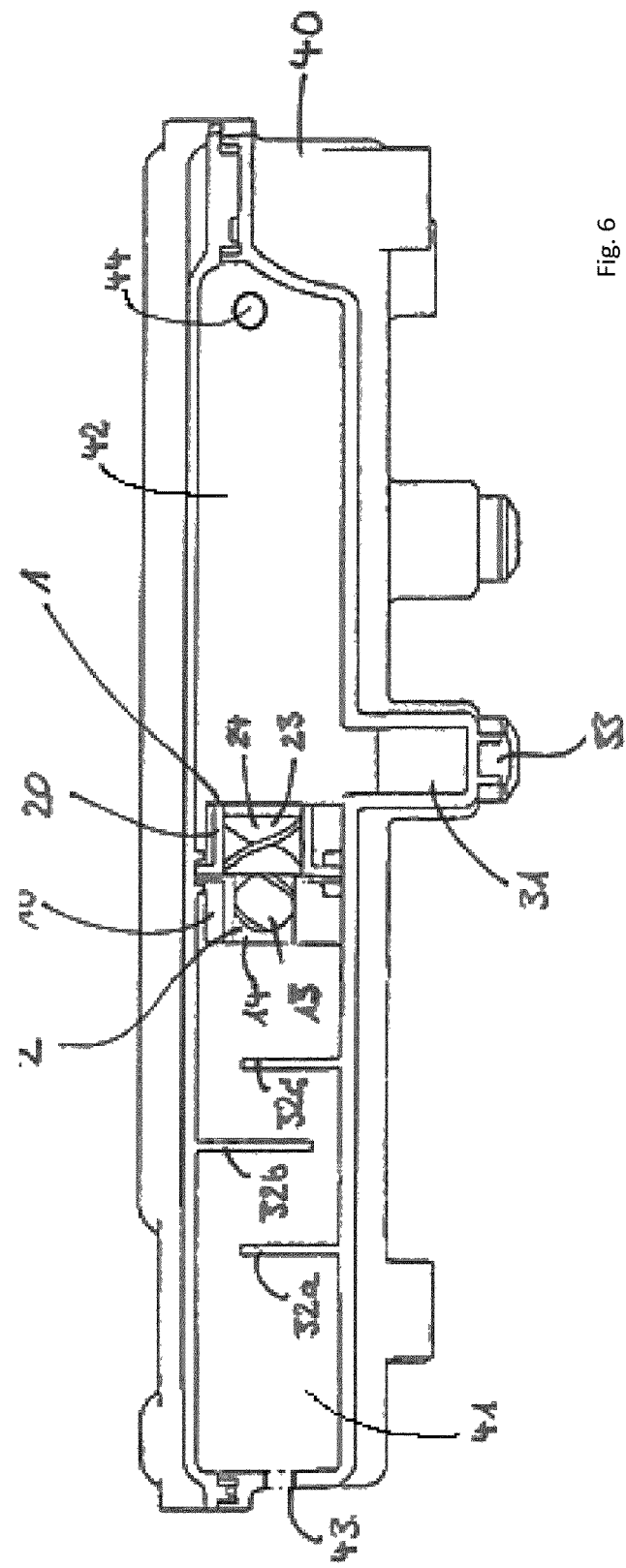
FIG. 6: A valve cover according to an example of the invention.

FIG. 6 shows a valve cover 40 according to the invention, as it is used in an internal combustion engine. The blow-by gases of the combustion engines flow through the valve cover via an inlet 43 and an outlet 44. In the flow path, two basic carriers 10, 20 are arranged, which are arranged with positive fit one on the other and which in cross section each comprise a passage pipe 14, 24 forming separator elements 13, 23. The two passage pipes 14 and 24 are arranged one behind the other in the flow direction and form a joint flow path 2 for the blow-by gases. The two basic carriers 10, 20 divide the valve cover 40 into two partial spaces 41, 42. A communication between the two partial spaces 41, 42 is only possible through the passage pipes 14, 24.

In each of the passage pipes, 14 and 24, helical segments are arranged as additional gas guiding structures, which comprise an inverse sense of rotation.

The liquid separation device 1 now provides for the separation of oil and oil mist from the blow-by gases; it is in particular the abrupt increase of the inner diameter of the flow path 2 at the transition between the separator element 13 and the separator element 23 that guarantees a high separation performance. The separated oil is guided into a sump or tank 31 and fed back from the valve cover 40 via a one-way valve 33 to the crank case (not shown).

Plates 32a, b and c are arranged ahead of the liquid separation device 1 with respect to the flow direction as impaction separators. These impaction separators 32a, b and c serve for the brute separation of oil and oil mist whereas the liquid separation device 1 according to the invention serves for the additional fine separation.

Figure 7:
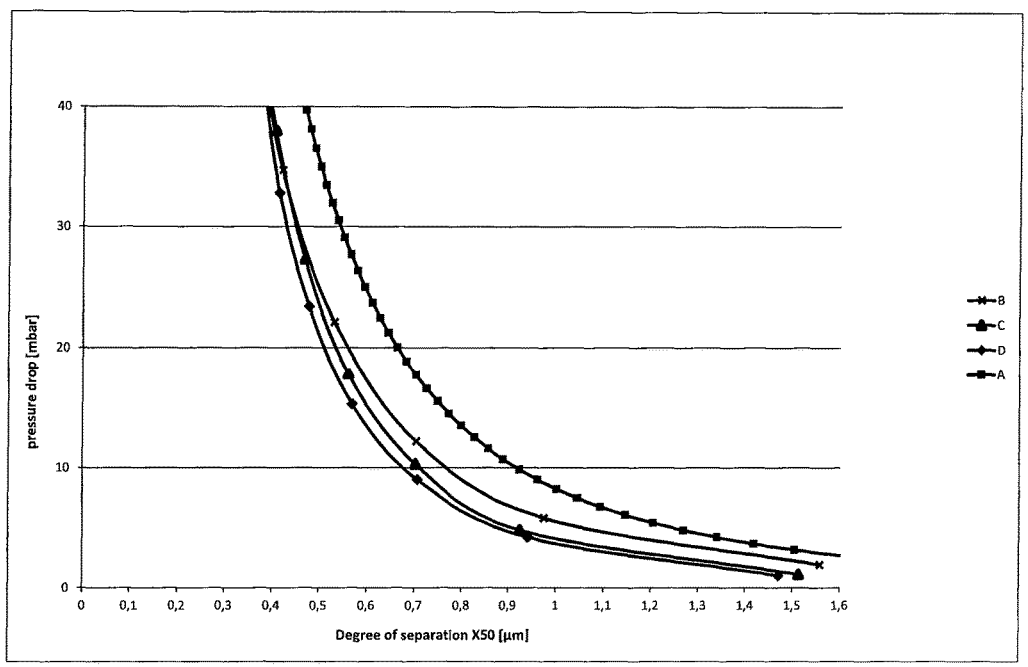
FIG. 7: A comparison of the separation efficiency between liquid separation devices according to the invention and liquid separation devices according to the state of the art.

FIG. 7 now shows the comparison between conventional liquid separation devices as they are known from DE 10 2004 037 157 A1 with liquid separation devices according to the invention. In FIG. 7, the pressure loss related to the separation of oil particles is shown. It is essential for liquid separators that the pressure loss for the separation of particles should be minimized. This means that with a predetermined pressure loss a percentage of particles as high as possible and as small particles as possible shall be separated. With a predetermined pressure loss at the separator, particles of different size are separated to a different degree. In general, it is easier to separate large particles, which means that they are separated to a higher degree than fine particles. It is therefore standard in a diagram as the one in FIG. 7 to draw the pressure loss against the degree of separation, thus against that size of particles, for which half of the particles is separated. This is the so-called X50 value. If one proceeds at a particular pressure loss on a line parallel to the x-axis towards the right side, then the respective curve indicates the size of those particles which are separated to 50% at this pressure loss. A separator is thus to be preferred if it allows for the separation of as small particles as possible at the predetermined pressure loss, thus if it allows to achieve a high degree of separation.

On the other hand, it can also be the aim to achieving a pressure loss at the separator as small as possible at a predetermined X50 value. This means that the separator is designed in such a way that with a given degree of separation, the pressure loss is kept as small as possible.

For this reason, separation systems, the curves of which come closer to the zero point of the drawing show a better separation performance.

For the measurements of the curves of FIG. 7, liquid separators have been used, which correspond to the ones in FIG. 3. This means that two plate-shaped basic carriers have been used, which comprise separator elements with different inner diameter. In the separator elements, in both basic carriers, helical segments are arranged, respectively, which show a rotation with half a pitch between the inlet and the outlet of the respective basic carrier and which are arranged with inverse sense of rotation. The thickness of the wall of the helical elements is variable, too.

The curve referred to as A has been measure with a liquid separation device, which shows a unitary inner diameter of 3.3 mm for both separator elements in both basic carriers and a thickness of wall of the helical element of 0.5 mm. The curve indicated with B again shows identical inner diameters for both separator elements, namely 2 mm, and a thickness of wall of the helical element of 0.15 mm. A and B thus correspond to the state of the art. The curve referred to with C has been determined with a separation device, where the separator element arranged upstream is designed with identical dimensions as the separator element used in FIG. 3, thus with an inner diameter of 2 mm and constant helix wall thickness. The separator element located downstream showed an inner diameter of 3 mm, the wall thickness of the helix here was not constant when considering a cross section orthogonal to the flow direction; it steadily increased from 0.5 mm in the area of the axis of the helix to 0.9 mm in the outer area.

This means that in the curve indicated with C, the inner diameter of the separator elements increased from 2 mm in the upstream separator element to 3 mm in the downstream separator element.

In the curve denominated with D, the upstream separator element in the first basic carrier is designed as the separator elements in curve B, also with identical dimensions. However, the downstream separator element in the second basic carrier shows an enlarged diameter of 3.3 mm. The wall thickness of the helix amounted to 0.5 mm. This means that the inner diameter of the two consecutive separator elements increased from 2 mm to 3.3 mm.

One can see from FIG. 7 that compared with curves A and B, a design where the inner diameter in the area of the transition from an upstream separator element to a downstream element increases, provides for a better separation performance. In particular, at identical pressure loss, smaller oil particles or oil droplets are separated and a higher degree of separation is achieve. On the other hand, this means that for the separation of particles of identical size, a smaller pressure loss has to be taken into account.

Further measurements have shown that the inner diameter of the separator elements is the essential factor for the improvement of the degree of separation.

The invention claimed is:

1. A liquid separation device for the separation of liquid or liquid mist from a gas, with
at least one pair of basic carriers comprising a first and a second plate-shaped basic carrier,
where in each of the first and the second basic carrier, at least two separator elements are formed,
where the separator elements each comprise a passage pipe with a gas inlet and a gas outlet, which are arranged at opposite sides of the respective plate-shaped basic carrier in such a way that the passage pipe extends through the respective plate-shaped basic carrier,
wherein
the first and the second basic carrier fit together one directly behind the other in a single gas flow direction, and
that each two separator elements in both basic carriers, respectively, fit together one directly behind the other, with their passage pipes forming continuous flow paths for the gas,
where at least in a transition area of a flow path from an upstream separator element to an adjacent downstream separator element, the inner diameter of the downstream separator element is larger than the inner diameter of the adjacent upstream separator element.

2. The liquid separation device according to claim 1, wherein at least in the area of the transition of one flow path of an upstream passage pipe to the adjacent downstream passage pipe, the inner diameter of the downstream passage pipe is larger than the inner diameter of the upstream pipe by ≥10%.

3. The liquid separation device according to claim 1, wherein the inner diameter at the transition of one flow path from an upstream flow pipe to an adjacent downstream flow pipe changes abruptly.

4. The liquid separation device according to claim 1, wherein the basic carriers arranged one next to the other are adhesively connected but not over their entire surface.

5. The liquid separation device according to claim 1, wherein at least in one, several or all passage pipes of the separator elements, a gas guiding element with guiding surfaces is arranged between the gas inlet and the gas outlet, the guiding surfaces of which together with the inner surface of the passage pipe divide the flow path in the passage pipe into at least two partial flow paths for the gas.

6. The liquid separation device according to claim 5, wherein the gas guiding elements are only formed in the passage pipes of the second basic carrier.

7. The liquid separation device according to claim 5, wherein at least one, several or all gas guiding elements are realized as helical segments with helicoids, the helicoids of which together with the inner wall of the passage pipe form at least two helical partial flow paths for the gas.

8. The liquid separation device according to claim 7, wherein the helical segments of two passage pipes following each other in the flow direction comprise different wall thicknesses.

9. The liquid separator according to claim 7, wherein in at least one, several or all flow paths, in each of the passage pipes arranged one adjacent to the other forming a flow path, at least one of said helical segments are arranged,
wherein the helical segments of passage pipes arranged one immediately after another and forming a flow path may immediately adjoin one to the other and/or
the inlet-sided edge of the helical segment in the downstream passage pipe is rotated relative to the outlet-sided edge of the helical element in the upstream passage pipe by a predetermined angle α.

10. The liquid separation device according to claim 9, wherein an outlet-sided edge of the helicoid of the helical segment in an upstream passage pipe and an inlet-sided edge of the helicoid of the helical segment in the adjacent downstream passage pipe are rotated one relative to the other around the central axis of the passage pipes of the separator elements, by 0°, 45°, 90° or 135°, respectively.

11. The liquid separation device according to claim 7, wherein the direction of rotation in two helical segments arranged one behind the other in a flow path is identical or inverse.

12. The liquid separation device according to claim 1, wherein in a flow direction of the gas in front of the first basic carrier and/or in a flow direction of the gas behind the second basic carrier at least one further plate-shaped basic carrier is arranged, in which at least one further separator element is arranged, with the further separator element comprising a further passage pipe with a gas inlet and a gas outlet, which are arranged on different sides of the further plate-shaped basic carrier in such a way that the further passage pipe extends through the further plate-shaped basic carrier and together with one of the passage pipes of the separator elements in the first and second basic carrier forms at least one common flow path for the gas.

13. The liquid separation device according to claim 1, wherein in at least one, several or all basic carriers between 2 and 80 separator elements are arranged one next to the other in the plane of the basic carrier.

14. The liquid separation device according to claim 1, wherein the separator elements arranged in one, several or all basic carriers or all separator elements arranged in one basic carrier are designed identical and that they are only different with respect to the arrangement of the gas guiding elements.

15. The liquid separation device according to claim 1, wherein the liquid is water that is separated from exhaust gases of a fuel cell.

16. The liquid separation device according to claim 1, wherein the liquid is oil that is separated from blow-by gases of an internal combustion engine.

17. The liquid separation device according to claim 16, wherein the liquid separation device is arranged at or in a valve cover housing, wherein the valve cover housing is divided into two partial spaces by the basic carriers so that a fluidic connection between the two partial spaces is only possible through the passage pipes.

* * * * *